United States Patent [19]

Koppe et al.

[11] Patent Number: 5,671,297
[45] Date of Patent: Sep. 23, 1997

[54] METHOD FOR DISTORTION CORRECTION OF X-RAY IMAGES, AND DEVICE FOR CARRYING OUT THE METHOD

[75] Inventors: Reiner H. Koppe, Hamburg; Erhard P. A. Klotz, Hodorf, both of Germany

[73] Assignee: U.S. Philips Corporation, New York, N.Y.

[21] Appl. No.: 612,006

[22] Filed: Mar. 4, 1996

Related U.S. Application Data

[63] Continuation of Ser. No. 246,027, May 19, 1994, abandoned.

[30] Foreign Application Priority Data

May 19, 1993 [DE] Germany .................. 43 16 847.7

[51] Int. Cl.⁶ .................................................. G06K 9/32
[52] U.S. Cl. ................................................. 382/293; 382/132
[58] Field of Search .............................. 382/132, 194, 382/205, 293, 295; 48/241, 335; 378/207, 89, 98

[56] References Cited

U.S. PATENT DOCUMENTS

| | | | |
|---|---|---|---|
| 5,173,948 | 12/1992 | Blackham et al. | 382/44 |
| 5,231,673 | 7/1993 | Elenga | 382/6 |
| 5,263,074 | 11/1993 | Sakamoto | 378/99 |
| 5,276,519 | 1/1994 | Richards et al. | 358/209 |
| 5,319,749 | 6/1994 | Haaker et al. | 395/166 |

OTHER PUBLICATIONS

"High Speed Digital Radiographic Pincushion Distortion Correction Using an Array Processor" S. Tehrani et al, IEEE Comp. in Cardiology, Boston Oct. 7–10, 1986 (1987) pp. 615–618.

"Image Transformation Approach to Nonlinear Shape Restoration" Y. Tang et al, IEEE Transactions on Systems, Mand and Cybernetics, Jan./Feb. 1993 p. 155–.

"High–Speed Digital Radiographic Pin Cushion Distortion Correction Using an Array Processor" Computers in Technology, Oct. 7, 1986 pp. 615–618.

*Primary Examiner*—Joseph Mancuso
*Attorney, Agent, or Firm*—Jack D. Slobod

[57] ABSTRACT

A distorted input image, produced by an X-ray exposure and composed of pixels defined by their position and their respective input image value, is transformed into a substantially distortion-free output image composed of pixels defined by their position and their output image value. Improvement is achieved in that the transformation utilizes a determination of the position of the corner points of the pixels of the output image (or the input image) as well as the surface area of a polygon defined by the corner points in the input image (output image).

4 Claims, 3 Drawing Sheets

METHOD FOR DISTORTION CORRECTION OF X-RAY IMAGES, AND DEVICE FOR CARRYING OUT THE METHOD

This is a continuation of application Ser. No. 08/246,027 filed May 19, 1994 now abandoned.

BACKGROUND OF THE INVENTION

1. Field of the Invention

The invention relates to a method for transforming a distorted input image, produced by an X-ray exposure and composed of pixels defined by their position and their respective input image value, into a substantially distortion-free output image composed of pixels defined by their position and their output image value.

2. Description of the Related Art

A pixel is to be understood to mean the smallest unit of surface area whereto a uniform brightness value which deviates from that of its environment can be assigned. This brightness value, being a measure of the absorption of the X-rays during the X-ray exposure, is referred to hereinafter as image value. The image values associated with the pixels of the distorted input image are referred to as "input image values" whereas the image values of the output image are referred to as "output image values". The input image values, or the input image, are produced by the X-ray exposure. The output image values are derived from the input image values by the transformation process.

Methods of this kind are known, for example from the article by Tehrani et al (IEEE Comp. in Cardiology, Boston, Oct. 7–10, 1986 (1987), pp. 615 to 618). In this method it is assumed that a pixel in one image retains its magnitude and shape in the other image after transformation. The transformation is performed so that for all pixels of the output image their position in the input image is calculated. If this position corresponds exactly to the position of a pixel in the input image, the input image value thereof is assigned as an output image value to the pixel of the output image. However, if instead the transformed pixel partly covers several pixels (usually four) in the input image, the pixel of the output image will be assigned an output image value which corresponds to the weighted sum of the input image values associated with the pixels of the input image partly covered by the transformed pixel. This so-called bilinear interpolation enhances the quality of the distortion-corrected output image (in comparison with the case where the pixel of the output image is assigned only the input image value of the pixel in the input image which is nearest to the transformed pixel), but the image quality is still not satisfactory, notably not in the case of strong distortions.

SUMMARY OF THE INVENTION

It is an object of the invention to provide a method of the kind set forth offering improved image quality of the output image.

According to a first, preferred solution the position of the corner points of the pixels of the output image in the input image is determined as well as the surface area of the polygon defined by the corner points in the input image, the pixels of the output image being assigned a respective output image value which corresponds to the integral of the input image values over the input image surface area covered by the associated polygon.

According to a second solution, the position of the corner points of the pixels of the input image is determined in the output image and also the surface area of the polygon defined by the corner points in the output image, the input image values of the pixels whose corner points are situated in a pixel of the output image being used by weighted summing, to determine the output image value of the relevant pixel of the output image.

The invention is based on the recognition of the fact that the assumption underlying the known methods, i.e. the assumption that the pixels retain their magnitude and shape after transformation, is merely an approximation which is more inaccurate as the distortion in the image is greater. This is because in the case of strong distortion the (for example) square shape of a pixel in one image becomes a rhombic or trapezoid rectangle in the other image after transformation; the surface area of said rectangle may deviate from the surface area of the associated pixel in the input image. The inaccuracies inherent in the change of the shape and the surface area of the pixel due to the transformation are avoided by the invention in that the determination of the position of a transformed image is not based on merely a single point (for example, the centre of the pixel) but on all corner points of the relevant pixel (i.e. on four corner points in the case of a square pixel).

The solutions based on these considerations are distinct in that the first solution is based on the pixels of the output image where the position of their corner points in the input image is determined, whereas the second solution is based on the pixels of the input image, where the position of their corner points in the output image is determined. Whereas according to the first solution the output image value associated with the relevant output image pixel is obtained directly, according to the second solution several image values must be summed (in a weighted fashion). Therefore, the first solution is simpler and preferred.

When the method in accordance with the invention is carried out so that first only a single pixel is considered and subsequently an output image value is derived for this pixel, or the polygon resulting therefrom by transformation, followed by treatment of a further pixel etc., a comparatively high calculation expenditure will be required, because for each pixel the position of its corner points (usually four) in the respective other image must be determined. This expenditure can be reduced in a further embodiment of the invention in that first the position of the corner points of all pixels is determined and stored before the image values of the input image are assigned to those of the output image. This solution is based on the assumption that each corner point belongs to several pixels, with the exception of the corner points of pixels situated at the edges of the image; in the case of rectangular pixels, the corner points situated within the image belong to four pixels. Consequently, the position of these corner points need be determined only once, so that the calculation is substantially accelerated.

However, according to this solution not only the input image and the output image need be stored, but also the position of the corner points of one image in the respective other image. Such storage expenditure can be reduced in accordance with the invention in that the position of the corner points associated with a first row or column of pixels is calculated and stored, that subsequently assignment takes place for pixels of this row or column and the corresponding polygons in the other image, that subsequently the position of the corner points of a second row or column of pixels, neighbouring the first row or column, is determined while utilizing the corner points, associated with these pixels, of the pixels of the first row or column, after which for the second row or column of pixels the assignment of the image values is carried out. This solution requires intermediate storage only for the corner points of two rows (or columns) of pixels.

A device for carrying out the method in accordance with the invention is characterized in that it comprises a) an X-ray system for generating an input image by way of an X-ray exposure,
  b) an image converter for converting the input image into a series of digital image values,
  c) a storage device for storing input image values and output image values,
  d) means for determining the position of corner points of one image in the other image as well as the surface area of the polygons defined by the corner points in the other image,
  e) means for assigning the image values of a pixel to the associated polygon in the other image.

BRIEF DESCRIPTION OF THE DRAWING

The invention will be described in detail hereinafter with reference to the drawings. Therein.

DETAILED DESCRIPTION OF THE PREFERRED EMBODIMENT

Figure 1:
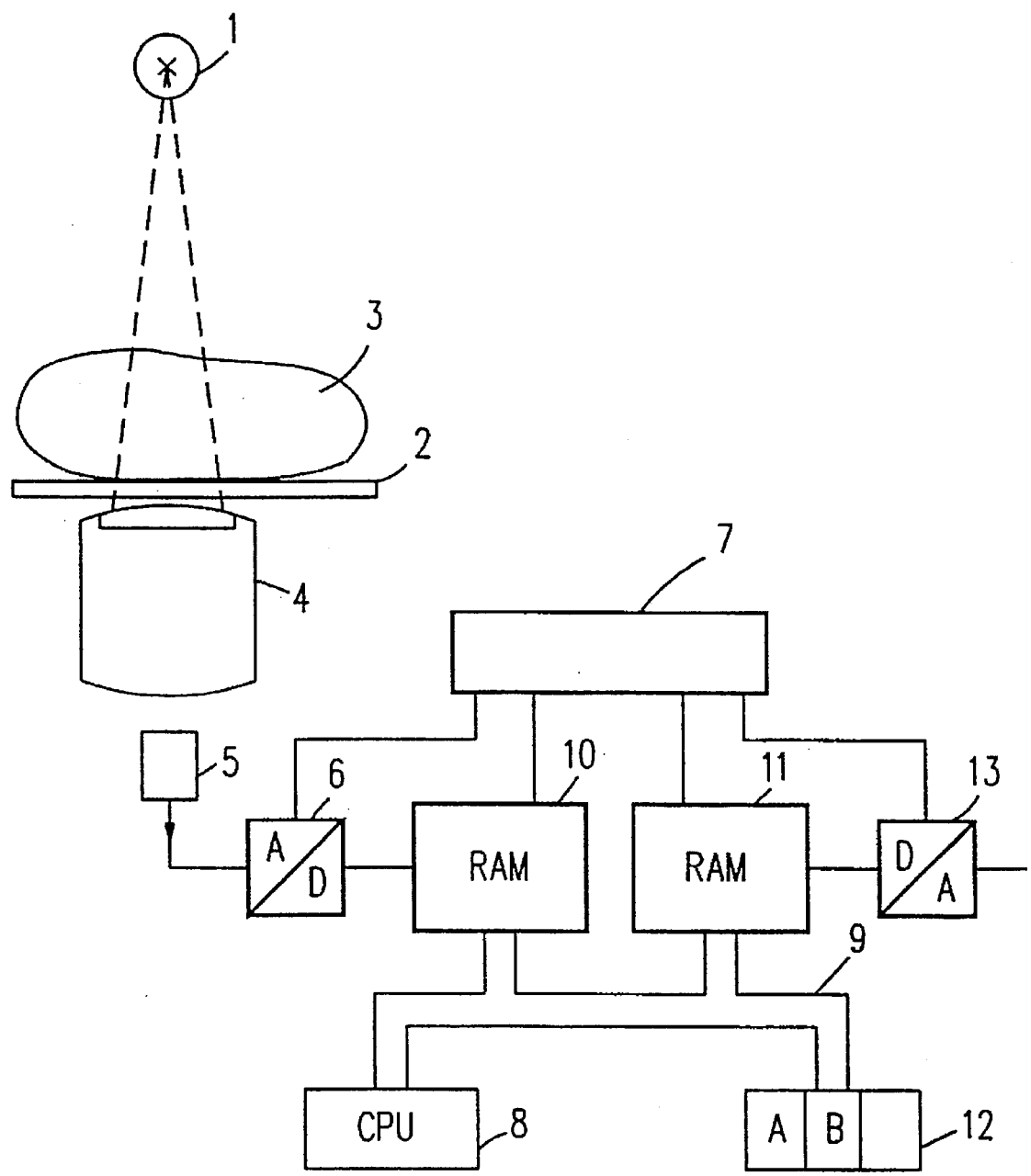
FIG. 1 shows a block diagram of a device for carrying out the invention.

The X-ray system shown in FIG. 1 comprises an X-ray source 1 which irradiates a patient 3 positioned on a table top 2. The X-ray relief thus produced is applied to the entrance screen of an image intensifier 4 whose brightness-intensified output image is picked up by a television camera 5. The entrance screen of the intensifier 4 is curved, so that the image supplied by the image intensifier exhibits barrel or pins cushion distortion. Further, less pronounced geometric distortion is introduced by the effect of the terrestrial magnetic field and by the video camera 5.

The analog video signal supplied by the video camera 5 is converted into a series of digital data words by an analog-to-digital converter 6, said data words being stored at successive addresses in a memory 10. This operation is controlled by a video control unit 7. The memory 10, thus containing the distorted input image, is connected, via a bus system 9, to a microcomputer 8 which can also access further memories 11 and 12 via this bus system. The memory 11 serves to store the output image wherefrom distortion has been removed by the transformation. Via the video control unit 7, the output image values can be read from the memory 11 so as to be applied, via a digital-to-analog converter 13, to a display unit (monitor) which is not shown.

Subsequent to an X-ray exposure, the memory 10 contains the distorted input image ($B_i$). The formation of a distortion-free image ($B_o$) in the memory 11 by transformation will be described hereinafter with reference to the FIGS. 2 and 3.

Figure 2:
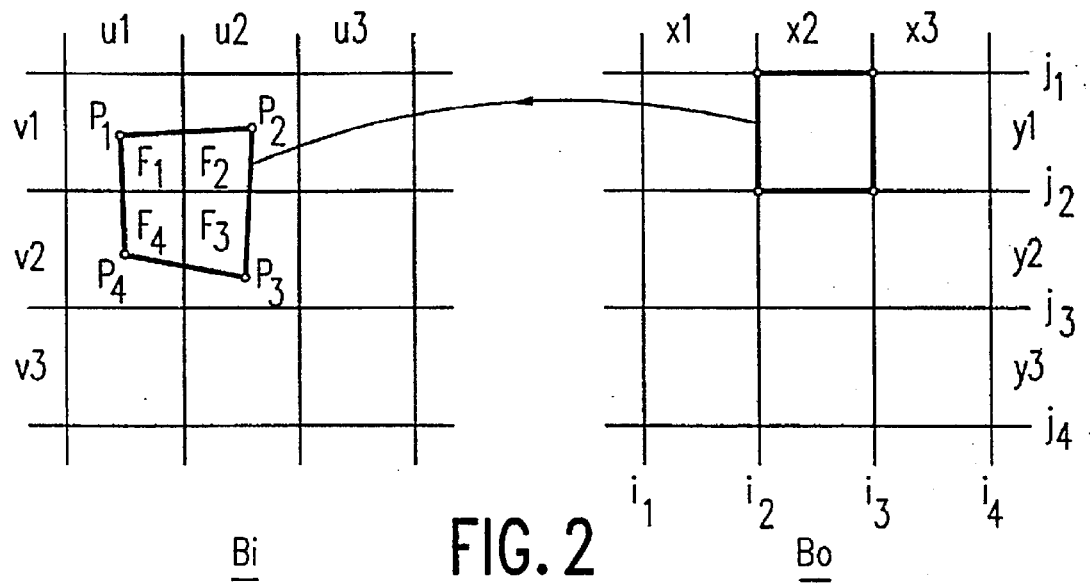
FIG. 2 shows a detail of the input image and the output image for the first solution.

FIG. 2 shows a part of the image matrix of the input image $B_i$ and of the output image $B_o$. The part constitutes an area of 3×3 pixels. As is customary, the pixels have a square shape. In principle, however, other shapes are also feasible, for example a rectangular or hexagonal shape. The pixels of the input image $B_i$ are characterized by their position, i.e. by their coordinates u,v (with u ($u_1$, $u_2$, $u_3$ ...) and v ($v_1$, $v_2$, $v_3$ ...)). Similarly, the coordinates x ($x_1$, $x_2$, $x_3$ ...) and y ($y_1$, $y_2$, $y_3$ ...) characterize the position of the pixels in the output image. The pixels in the output image are bounded horizontally by lines i ($i_1$, $i_2$, $i_3$ ...) and in the vertical direction by lines j ($j_1$, $j_2$, $j_3$ ...). Such boundary lines are also present in the input image $B_i$, but they need not be designated for the method of the invention. The points of intersection of two lines i,j define a respective corner point. In an image comprising N×N pixels, there are (N+1)×(N+1) corner points. In practice N amounts to, for example 512.

The discrete values for u,v and x,y characterizing the position of a pixel (or its centre) in the input image $B_i$ and in the output image $B_o$, respectively, are preferably integer values. Each combination u,v in the input image $B_i$ or x,y in the output image $B_o$ is assigned to a memory location having a given address in the memory 10 and the memory 11, respectively.

The first step of the method consists in determining, on the basis of the pixels of the output image, the spatial association with the pixels of the input image. Whereas for this purpose known methods calculate per pixel the position of a single point, for example the centre, and assume that the position and magnitude remain unchanged, the method in accordance with the invention calculates the position of several points per pixel, that is to say the position of all (four) corner points. However, the calculation expenditure on these calculations is only slightly greater, because each corner point of a pixel, with the exception of the corner points at the image edges, also belongs to three further pixels. Instead of N×N calculations, according to the invention (N+1)×(N+1) calculations are required.

For the method described with reference to FIG. 3 it is assumed that during the preceding program section 101 the coordinates u,v of all corner points of the output image on the line $j=j_1$ in the input image have been calculated and stored in the section A in the memory 12. During the next step 102, the coordinates u,v are calculated of the corner points in the output image which are situated on the next line ($j=j_2$). As is known from the article by Tehrani et at., this calculation can be performed by way of a polynomial in conformity with the equations (1) and (2):

$$u = a_0 + a_1 i + a_2 j + a_3 ij + a_4 i^2 + a_5 j^2 \quad (1)$$

$$v = b_0 + b_1 i + b_2 j + b_3 ij + b_4 i^2 + b_5 j^2 \quad (2)$$

The coefficients $a_0 \ldots a_5$ and $b_0 \ldots b_5$ are determined once by means of a raster-like test object so as to be stored and used for the calculations for all subsequent images. In the case of strong distortions, the calculations must be performed with a higher accuracy, for example by means of a higher-order polynomial. The coordinates u,v thus calculated are stored in the section B in the memory 12.

The position of all corner points of the pixels in the row $y=y_1$ has then been stored, and it can be calculated which output image values must be assigned to the pixels of the output image. The image values of the output image are referred to as $B_o(x,y)$ hereinafter and the image values of the input image as $B_i(u,v)$. FIG. 3 shows that the four corner points of the output image pixel having the coordinates $x_2, y_1$ become the four points $P_1, P_2, P_3$ and $P_4$ in the input image. It is also assumed that the four straight lines in the output image which interconnect the four corner points also become straight lines in the input image, so that a polygon is obtained, i.e. a rectangle in the case of four corner points.

This assumption is not completely exact (the connecting lines between the points $P_1 \ldots P_4$ may also be curved lines), but constitutes a suitable approximation.

The calculation in the block 103 is based on the idea that the output image value is formed by the weighted sum of the input image values of the input image pixels covered by the quadrangle $P_1 \ldots P_4$. The input image values contribute to the output image value with a weight which is greater as the surface area covered by the quadrangle in the relevant image is greater. When these surface areas are denoted by the references $F_1 \ldots F_4$ in conformity with FIG. 2, the following equation is obtained for the output image value $B_o$ $(x_2, y_1)$:

$$B_o (x_2, y_1) = c(F_1 B_i(u_1, v_1) + F_2 B_i(u_2, v_2) + F_4 B_i(u_2, v_2))/F \quad (3)$$

Therein, c is a suitably chosen constant which is the same for all pixels of an image, and F is the overall surface area of the quadrangle $(P_1 \ldots P_4)$ in the input image $(F = F_1 + F_2 + F_3 + F_4)$. Generally speaking, the output image value corresponds to the integral of the input image values over the surface area of the quadrangle.

This calculation is performed for all pixels of the row $y = y_1$ during the step 103, and the output image values $B_o (x, y_1)$ thus obtained are stored in the memory 11 for the output image $B_o$.

Subsequently, it is checked (104) whether the last row $(j = N+1)$ of corner points has already been processed. If this is not the case, the row number is incremented by 1 (for example, to $j = j_3$ in the present example) and so is the number of the pixel row $(y = Y_2$ (step 105)).

For the new row of corner points of the output image their position u,v in the input image is again calculated during the step 102. The values calculated for the row $j = j_1$ are overwritten in the section A of the memory 12 by the values thus calculated. Thus, the sections A and B of the memory 12 store the coordinates u,v of the corner points for the rows $j = j_2$ and $j = j_3$ which define the pixels of the row $y = Y_2$. The associated output image values are calculated during the step 103, after which the check 104 is carried out again. When the loop 102 . . . 105 is completed once more, the values u,v calculated during the step 102 are overwrite to erase alternately the values stored in the sections B and A. When the check reveals that the last row $(j = N+1)$ has been processed, all image values of the output image have been calculated and the program is terminated (106).

The position of the corner points can also be column-wise calculated $(i = i_1, i_2$ etc.) instead of row-wise. In that case the output image values for a column $(x = x_1)$ are successively calculated during the step 103, and during the step 104 it must then be checked whether the last column of corner points has already been processed $(i \geq N?)$.

The calculation expenditure could in principle be reduced by calculating the coordinates u,v for all corner points of the output image once and by storing these coordinates (in the form of an address list). However, this would substantially increase the required of storage capacity, notably when input images exhibiting different distortions are to be processed, as in the case of tomosynthesis where a plurality of X-ray images are formed by means of X-rays incident on the image intensifier 4 from different radiation source positions. Therefore, the renewed calculation of the position of the corner points for each exposure is to be preferred, because in that case only one set of polynomial coefficients $a_0 \ldots a_5$ and $b_0 \ldots b_5$ need be stored for each input image (see equations (1) and (2)).

The second solution will be described hereinafter with reference to the FIGS. 4 and 5. As appears from FIG. 4, this solution is based on the corner points of the input image and the position these corner points in the output image is determined first. The four corner points in the input image define a quadrangle in the output image (for example, $P_1 \ldots P_4$) which covers several pixels (4 in this case). For each of these pixels a (partial) output image value is derived from the input image value of the associated input image pixel, which (partial) output image value corresponds to the ratio of the surface area of the pixel covered by the quadrangle to the overall surface area of the quadrangle.

For the transformation method of FIG. 4, explained with reference to FIG. 5 in conjunction with FIG. 4, it is again assumed that in the section A of the memory 12 the position of the associated coordinates x,y in the output image has been calculated and stored (block 201) for a first row of corner points (for example $j = j_2$) of the input image. During the first step 202, the associated coordinates x,y in the output image are calculated for the next row $(j = j_3)$ in the input image. This calculation can be performed by means of a polynomial in conformity with the equations (1) and (2) when u is replaced by x and v is replaced by y; however, the polynomial coefficients $a_0 \ldots a_5$ and $b_0 \ldots b_5$ do not correspond to the polynomial coefficients obtained by the method in conformity with the first solution, because inverse functions are concerned. The values x,y thus calculated are written into the section B of the memory 12 (FIG. 1).

The memory 12 then stores the position of two rows of corner points which together define one row of pixels.

Subsequently, for the pixels covered by the quadrangle in the output image the (partial) output image value $dB_o$ is derived from the input image value of the associated pixel in the input image (block 203). In conformity with FIG. 4, for example the output image pixels having the coordinates $x = x_2$ or $x = x_3$ and $y = y_1$ or $y = y_2$ are influenced by the input image value $B_i(u_2, v_2)$. For example, for the output pixel $x_2, y_2$ there is obtained:

$$dB_o (x_2, y_2) = c \cdot F_4/F_o \cdot B_i(u_2, v_2) \quad (4)$$

Therein, c is a constant, $F_o$ is the overall surface area of the quadrangle defined by the points $P_1 \ldots P_4$ in the output image, and $F_4$ is the partial surface area of the pixel $x_2, y_2$ covered by the quadrangle.

Figure 4:
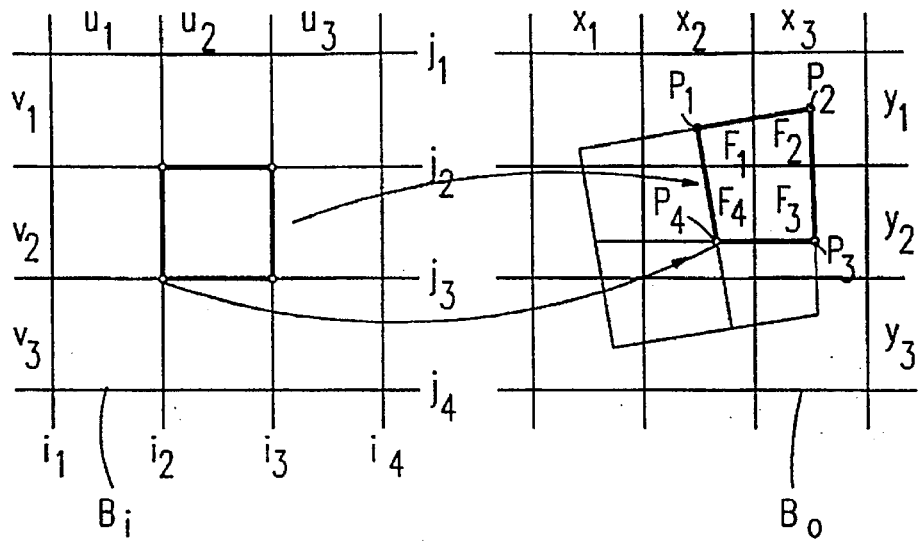
FIG. 4 shows a detail of the input image and the output image for the second solution.
Figure 5:
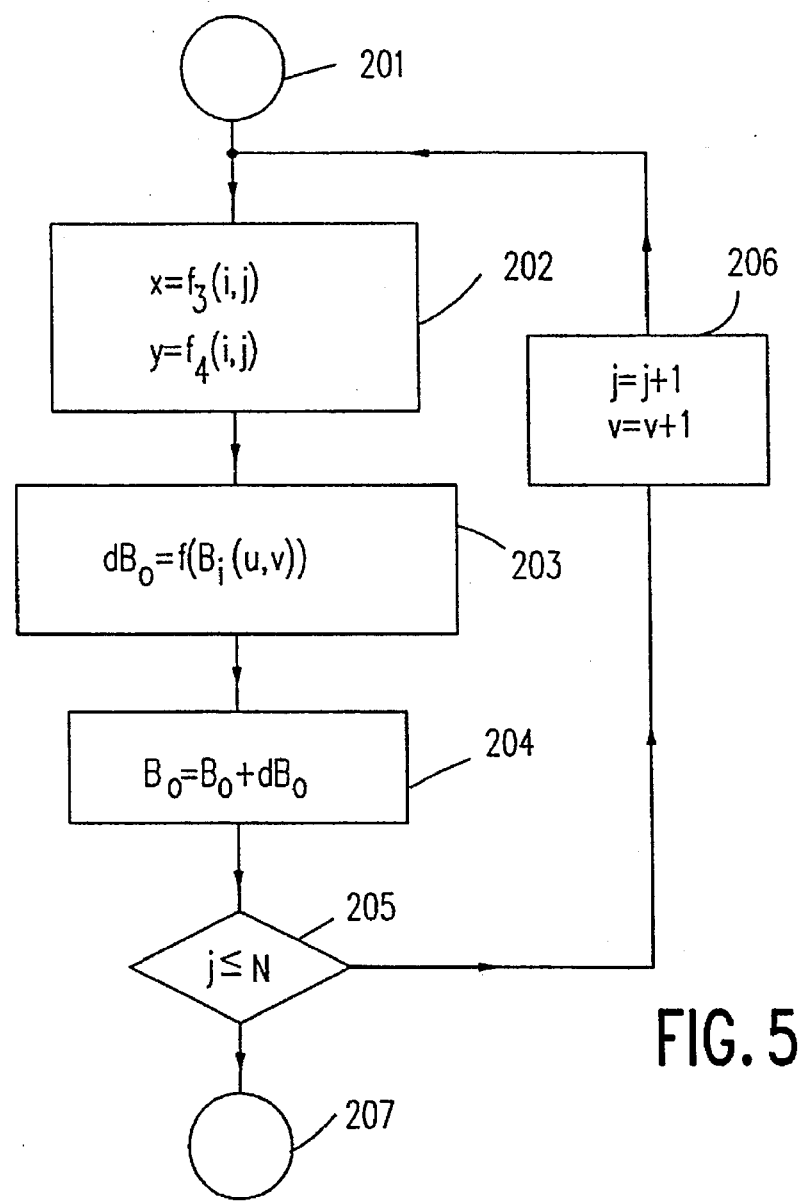
FIG. 5 shows a corresponding flow chart.

As appears from FIG. 4, however, the output image value $B_o (x_2, y_2)$ is dependent not only on the input image value $B_i (u_2, v_2)$, but also on the input image values $B_i(u_1, v_2)$, $B_i(u_1, v_3)$ and $B_i(u_2, v_3)$ which are associated and/or adjacent the pixel $u_2, v_2$ in the input image. Consequently, during the step 204 the value $dB_o$ is added to the output image value stored in the memory 11 for the relevant output image pixel in the memory 11.

When the last row of corner points has not yet been processed (check 205), the values j and v are incremented by $1(j = j_4$ and $v = v_3$ (step 306)), and during the step 102 the coordinates x,y of the corner points of this row in the output image are calculated. The calculated values overwrite the coordinates stored for the last row but one $(j = j_2)$ in the section A in the memory 12. Subsequently, the calculation process of the step 203 is repeated for the pixels of the next row $(v = v_2)$ and the values then calculated are added to the values already stored in the memory 11. When the program loop 204 to 206 is completed again, the newly calculated coordinate values overwrite the coordinates of the last row but one $(j = j_3)$ in the section B of the memory 12. The method is terminated when it is established during the step 205 that all rows of pixels of the input image have been treated in this manner.

Figure 3:
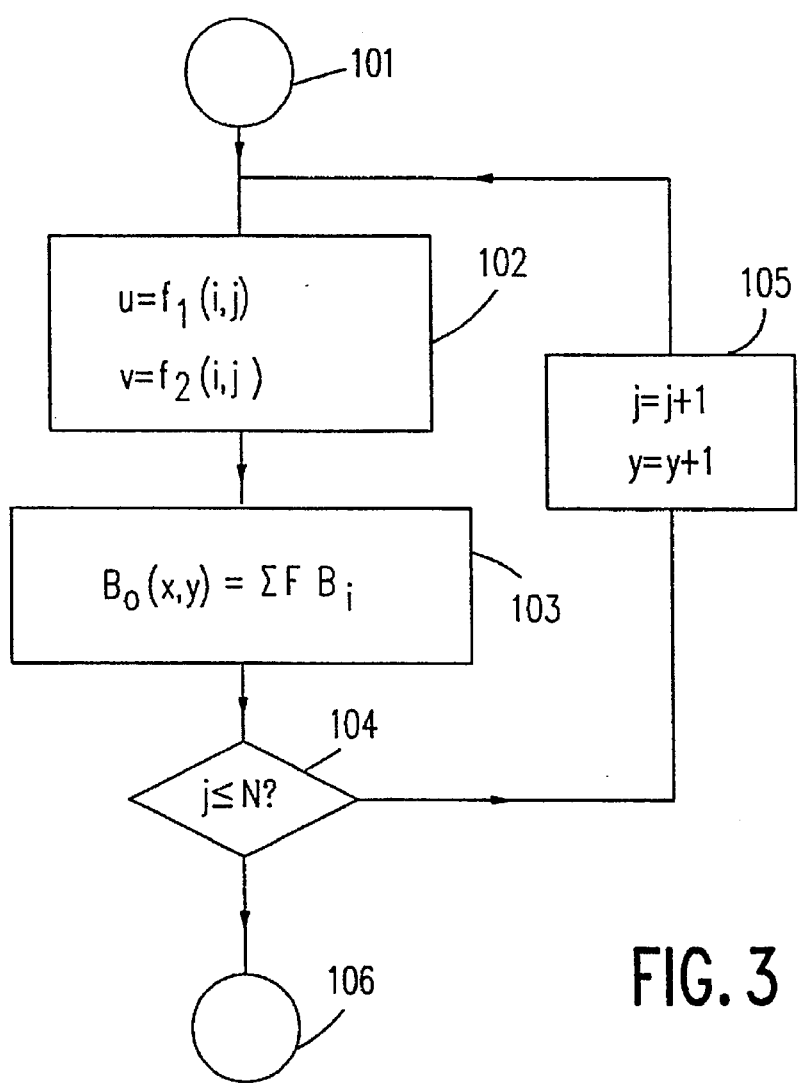
FIG. 3 shows a corresponding flow chart.

Because the output image values are only step-wise formed by addition or accumulation according to the second solution, whereas a complete image value is produced during each step (103) according to the method in conformity with the FIGS. 2 and 3, the first solution is to be preferred.

Evidently, analogously to the first method, the coordinates of the corner points in the output image can be column-wise determined instead of row-wise. Moreover, using a correspondingly greater storage capacity, the calculated coordinates can be calculated once and be stored in the form of an address list so as to be used for subsequent distortion elimination operations.

We claim:

1. A method for transforming a distorted input image (Bi) produced by an X-ray exposure and composed of pixels defined by their positions and their respective input image values, into a substantially distortion-free output image ($B_o$) composed of pixels each having a periphery defined by corner points interconnected by edges, said pixels being defined by their position in said array and their output image value, wherein the positions of corner points of the pixels of the output image ($B_o$) in the input image (Bi) are determined as well as the areas of polygons defined by the corner points of the pixels of the output image in the input image such that there is a different polygon in the input image associated with each pixel in the output image, each polygon covering fractions of one or more pixels in the input image, each pixel of the output image being assigned an output image value which corresponds to the sum of the products of the input image values times the fraction of input pixel area covered by the associated polygon.

2. A method as claimed in claim 1, wherein first the positions of the corner points of all pixels are determined and stored before the image values of the input image and the output image are assigned to one another.

3. A method as claimed in claim 1, wherein the positions in the input image of the corner points of the pixels in a first row or column of pixels in the output image are calculated and stored, subsequently assignment takes place for pixels of this row or column and the associated polygons in the input image, and subsequently the positions in the input image of the cornerpoints of the pixels of a second row or column of pixels in the output image, neighboring the first row or column, is determined while utilizing those of the first determined corner points shared by the pixels of the first row or column and the pixels of the second row or column, after which for the second row or columns of pixels, the assignment of the image values is carried out.

4. A device for transforming a distorted input image ($B_i$) produced by an X-ray exposure into a substantially distortion-free output image ($B_o$) comprising:

a) an X-ray system for forming the input image by way of an X-ray exposure, b) an image converter for converting the input image into a series of digital image values constituting the input image ($B_i$), c) a storage device for storing input image values, d) means for determining the position of corner points of the output image in the input images as well as the areas of polygons defined by the positions of said corner points of the output image in the input image such that there is a different polygon in the input image associated with each pixel in the output image, and e) means for assigning the image values of the pixels of the output image based on fractions of areas of pixels in the input image covered by the associated polygons in the input image and the image values of the covered pixels.

* * * * *